Nov. 19, 1940.    M. WASSERMAN    2,222,343
COMPOSITE SHEATHING AND INSULATING MATERIAL
Filed May 19, 1938
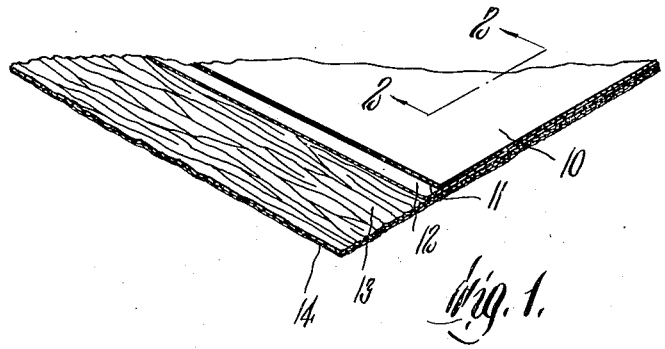
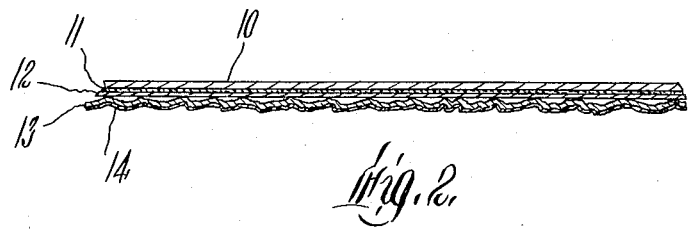
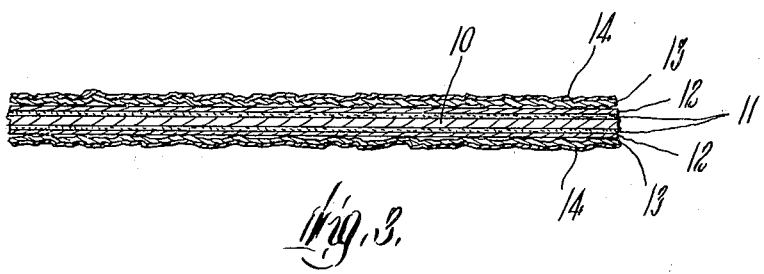
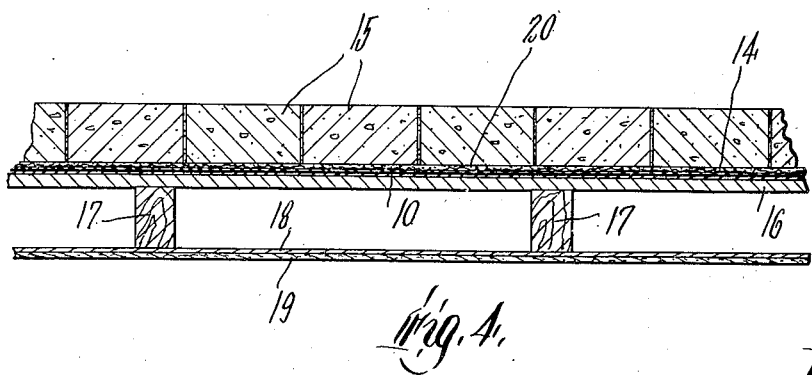
Inventor
Max Wasserman
by Nathaniel P. Wharton
Atty.

Patented Nov. 19, 1940

2,222,343

UNITED STATES PATENT OFFICE 2,222,343

COMPOSITE SHEATHING AND INSULATING MATERIAL

Max Wasserman, Cambridge, Mass., assignor to Wasco Flashing Co., Cambridge, Mass., a corporation of Massachusetts Application May 19, 1938, Serial No. 208,800

6 Claims. (Cl. 154—44)

This invention relates to a composite sheathing and insulating material. While not limited thereto, the material of the present invention is designed more especially for facing an inner brick-veneer wall or its equivalent and imparting to such wall desired thermo-insulation and waterproofness.

The composite sheet material hereof comprises a non-corrodible sheet metal base, such as copper, at least one face of which carries secured thereto a creped metallic membrane, for instance, a metallized creped paper. The creped metallic membrane affords a rough or irregular texture for excellent bonding with a layer of mortar or other plastic material spread on an inner brick-veneer wall or the like; and, by virtue of the markedly increased thermo-reflecting surface per unit of area covered by the creped metallic membrane, the heat-insulating value of the composite sheet is significantly enhanced. It is for this latter reason that the creped metallic membrane is preferably secured to both faces of the non-corrodible sheet metal base. The non-corrodible sheet metal base, which is preferably a foil but thicker than its creped metallic surfacing material or membrane, constitutes an efficient or enduring waterproofing medium, that is, a medium which can prevent leakage of moisture through a wall to the interior parts of a building even when the metallic surfacing and/or the paper sheet by which it is carried is faulty in this regard or develops faults in use. In other words, the metallic surfacing or membrane is valued primarily for its thermo-insulating capacity.

With the foregoing and other features and objects in view, the present invention will now be described in further detail with particular reference to the accompanying drawing, wherein:

Figure 1 depicts in perspective a fragment of single-faced composite sheet material embodying the present invention, certain plies or layers thereof being partly removed for clarity of illustration.

Figure 2 is an enlarged fragmentary section through the material on the line 2—2 of Figure 1.

Figure 3 is a similar section through double-faced composite sheet material embodying the present invention.

Figure 4 represents a horizontal section through a brick-veneer building wall in which the composite sheet material hereof has been used for facing the inner brick wall.

The sheet metal base 10 of the composite sheet hereof shown in Figure 1 may consist of copper, aluminum, or other non-corrodible sheet metal, for instance, copper foil such as is available on the market as electrolytic or electrodeposited copper and such as may have a thickness of, say, about 0.005 to 0.010 inch. Bonded to one face of such foil, as by a coating 11 of asphalt, rubber cement, or other preferably waterproof adhesive, is shown a two-ply paper sheet, the inner ply 12 of which may be a flat or plane paper sheet and the outer ply 13 of which is a creped paper sheet carrying a thin membrane or exposed layer 14 of aluminum, copper, chromium, or other lustrous metal of good thermo-reflecting capacity. The membrane or exposed layer 14, which may be deposited by spray-coating, painting, or electro-depositing the lustrous metal on the creped paper sheet 13 either before or after it has been adhesively united or plied to the plane paper sheet 12, may well be much thinner than the metal foil 10 so as to assume the irregularities or creped texture of its creped paper carrier, i. e., so as to conform to the rugosities of the creped paper surface.

The composite sheet of Figure 1 appears in Figure 4 as part of a brick-veneer building wall comprising an external course of brick 15, wooden planking 16 spaced somewhat from the inner brick wall and secured to the outer faces of the usual wooden studs 17, plaster lathing 18 secured to the inner faces of the wooden studs 17, and a layer of plaster 19 or the like anchored to the lathing 18. The composite sheet hereof is fastened, as by nails, to the planking 16, whereupon, as the brick wall or veneer is being erected and is being coated on its inner face with a layer 20 of mortar or other suitable bonding material, the creped metal membrane 14 becomes firmly bonded to the inner wall of the brick, since the mortar or the like enters from the layer 20 into the myriad recesses or indentations presented by the membrane 14 and then sets in such recesses to lock or key the composite sheet firmly throughout against shifting, buckling, or other undesirable distortion. The membrane 14 also serves as an excellent insulating medium because of the large aggregative thermo-insulating or thermo-reflective surface presented thereby. The metal foil ply 10, immediately adjacent to which the planking 16 occurs, prevents water from leaking through the wall to the wooden wall elements, the plaster, or other building portions. It is thus seen that the composite sheet material hereof fulfills well its intended purpose.

The composite sheet shown in Figure 3 is similar to that of Figure 2, excepting that a two-ply paper sheet carrier with an exposed creped metallic membrane or coating 14 is bonded to each face of the metal foil ply 10. Such a structure represents a preferred embodiment of the present invention in that both its faces lend themselves to the desired firm bonding with the mortar or other plastic layer on the inner brick wall and in that its thermo-insulating value is even greater by virtue of the lustrous metal surfaces on both its faces, which constitute barriers to thermal transfer from the building inside to the building outside and vice versa. Again, the structure of Figure 3 is especially valuable when both of its faces are to be bonded to mortar or other bonding material, as, for example, when such structure is to be used as a flashing in a mortar seam in the side walls of a building for the purpose of preventing water from seeping through the walls and thus impairing the ceilings and floors or other portions of the building.

The composite sheet material hereof may be fabricated economically, since a continuous sheet of single-ply or double-ply creped paper may be readily metallized, as by spray-coating with aluminum or other lustrous metal, whereupon the spray-coated sheet may be progressively united with a continuous sheet of the copper or other non-corrodible metal whose surface may be progressively coated with asphalt or other adhesive medium for uniting the sheets. Of course, the metallization of the creped paper sheet, as by spray-coating with the molten metal or by coating with metallic paint containing finely powdered metal or metal dust, may occur after its adhesive union with the non-corrodible metal sheet or foil has been effected. A two-ply paper carrier for the metallic coating or membrane may, as already described, advantageously comprise a plane or flat paper sheet for adhesive union with the metal sheet or foil, since it is thereby possible to provide only a very thin adhesive coating on the metal sheet or foil and yet realize the desired strong bond between such paper sheet and the metal sheet. The plies of the two-ply paper sheet are preferably impregnated with suitable waterproofing material, such as asphalt, as well as adhesively secured to each other by asphalt or equivalent waterproof adhesive.

It is possible to apply the inventive principles hereof in the fabrication of composite sheets departing in one or more respects from the particular and preferred structures hereinbefore described. Thus, the paper carrier may be omitted and the metal sheet 10 may be faced directly on either or both its surfaces with comparatively thin creped metal membranes or tissues adhesively secured thereto and presenting a creped or rough texture consonant with the desired bond to mortar or similar plastic material and the desired high thermo-reflectivity or low emissivity to radiated heat. Again, the paper carrier or backing itself may be a plane or flat paper sheet but carry adhesively secured thereto a creped metal tissue so that such carrier and tissue may both be adhesively united to a copper foil or other metal sheet to form the composite sheet hereof. Because of the ease and economy with which a creped metal membrane can be developed in situ on a creped paper carrier or backing, as by spray-coating the backing with molten metal or by coating the backing with metallic paint, it is preferable to employ such backing or carrier in fabricating the composite sheet hereof. It might be noted that while any lustrous or glossy metal is suitable for developing the creped external or exposed metallic membrane forming part of the composite sheet hereof, aluminum has been found to be particularly suitable because of its light-weight, non-corrodibility, high thermal-reflectivity, and its availability in the form of aluminum paint.

I claim:

1. A composite sheet for sheathing and insulating purpose comprising a non-corrodible metal foil at least one face of which carries secured thereto a metal-coated, creped paper sheet, the metal coating on said sheet being lustrous, being much thinner than said foil, and presenting the creped texture of said creped paper sheet.

2. A composite sheet for sheathing and insulating purpose comprising a metal foil at least one face of which carries secured thereto metallized creped paper having an exposed metal layer conforming to the rugosities of the creped paper surface.

3. A composite sheet for sheathing and insulating purpose comprising a non-corrodible metal foil to both of whose faces is adhesively secured metallized creped paper whose metallizing membrane affords an exposed thermo-reflecting metal layer conforming to the rugosities of the creped paper surface and is even thinner than said metal foil.

4. A composite sheet for sheathing and insulating purpose comprising a copper foil at least one face of which carries secured thereto metallized and waterproofed creped paper whose metallizing membrane affords an exposed lustrous metal layer conforming to the rugosities of the creped paper surface and is even thinner than said copper foil.

5. A composite sheet for sheathing and insulating purpose comprising a copper foil to both of whose faces is adhesively secured metallized and bituminized creped paper whose metallizing membrane affords an exposed thermo-reflecting metal layer conforming to the rugosities of the creped paper surface and is even thinner than said copper foil.

6. A composite sheet for sheathing and insulating purpose comprising a copper foil to at least one face of which is adhesively secured a bituminized creped paper sheet, said paper sheet being externally protected with an aluminum membrane even thinner than said copper foil and conforming to the rugosities of the creped paper sheet surface.

MAX WASSERMAN.